Dec. 12, 1944.   R. C. PIERSON   2,364,812
POPPET VALVE
Filed June 14, 1941
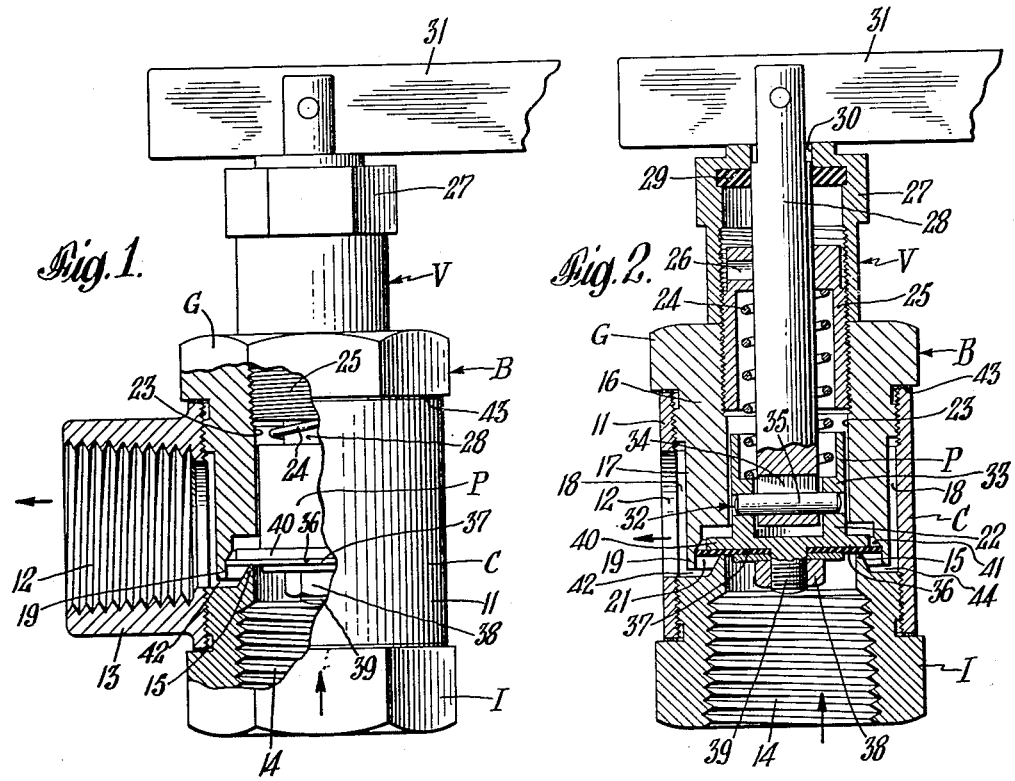
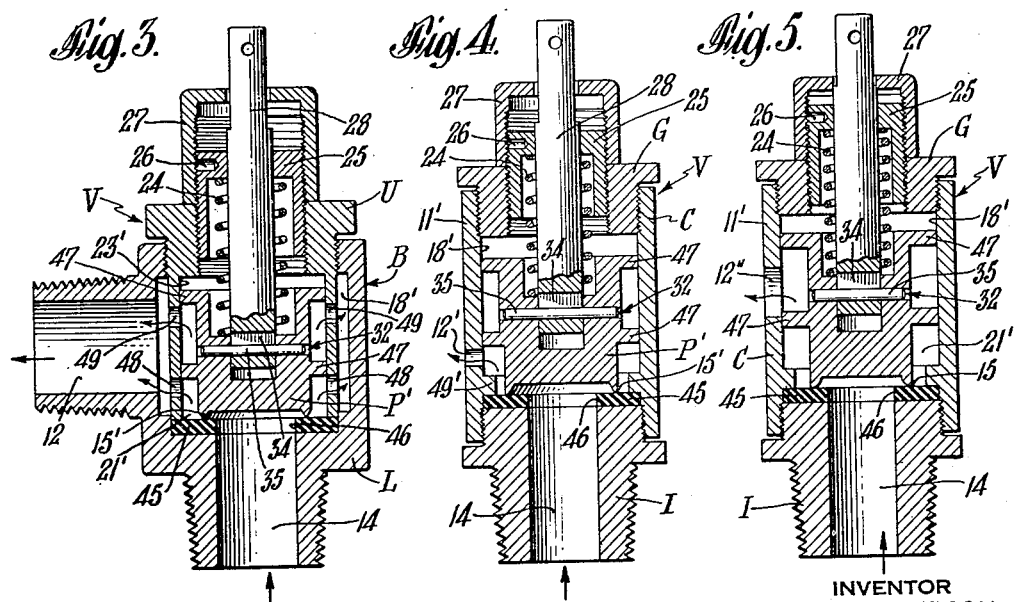
INVENTOR
RALPH C. PIERSON
BY
Chas C. Scheffler
ATTORNEY Patented Dec. 12, 1944

2,364,812

UNITED STATES PATENT OFFICE 2,364,812

POPPET VALVE

Ralph C. Pierson, Indianapolis, Ind., assignor to Union Carbide and Carbon Corporation, a corporation of New York Application June 14, 1941, Serial No. 398,076

17 Claims. (Cl. 137—53)

This invention relates to valves and more particularly to poppet-type relief valves adapted for use with acetylene generators and other systems developing relatively low pressures.

A distinct need has existed for a relief valve of simple construction and light weight which nevertheless can dischargre large volumes of fluid. This need has been satisfied in a large measure by the present invention, wherein a light weight valve body of improved design encloses a valve head of the poppet type. The present construction meets the demand for an improved valve for medium and low-capacity portable acetylene generators, wherein minimum weight and low cost are prime considerations, though the operating characteristics render the improved valve suitable for use on large stationary generators and other permanent installations as well.

The principal objects of the present invention are: to provide an improved valve of lightweight and simplified construction; to provide a relief valve so constructed that condensate drains away from the valve seat; to provide a valve arranged to minimize the possibility of failure of operation from sticking of the parts, e. g., by freezing of condensate; to provide a valve having a tamper-proof pressure adjustment; to provide a relief valve having improved manually-operable pressure-relieving means; to provide an improved relief valve having a seat that is replaceable without disturbing the pressure adjustment; and to provide a poppet relief valve having diaphragm means adapted to render the valve more positive in its action, and to protect parts of the valve from exposure to the discharged fluid. These and other objects of the present invention will become more readily apparent from the following specification and from the accompanying drawing showing several forms of valves embodying principles of the present invention.

In the drawing:

Fig. 1 is a side elevational view, with certain parts in section of one form of my improved poppet valve especially adapted for use with stationary acetylene generators and other permanent installations;

Fig. 2 is a vertical sectional view of a valve substantially identical with that shown in Fig. 1, but wherein the discharge nipple has been omitted; and, Figs. 3, 4, and 5 are vertical sectional views of modified types of valves incorporating improved structural features also found in Figs. 1 and 2.

Generally speaking, the invention comprises an improved type of relief valve having a thin circular resilient disc functioning both as a valve seat and as a seal between adjoining parts of the valve body. The poppet valve is urged resiliently against the seat by adjustable spring mechanism mounted within the valve body as a unit in such a manner that the valve disc may be replaced without altering the pressure adjustment of the spring. A valve lifter, comprising an elongated stem projecting to a point outside of the valve, provides manually-operable means for opening the valve. A lost-motion connection between the poppet valve head and the valve lifter allows the head to be unseated by the operating pressure without imparting movement to the valve lifter.

Referring more particularly to Figs. 1 and 2, one form of the invention comprises a fluid pressure relief valve V having a normally closed poppet P adapted to be unseated when the operating pressure exceeds a predetermined degree. The valve V comprises a valve body B having a hollow tubular casing C such as an open ended hollow cylinder in the opposite ends of which an inlet body I and a valve-guiding body G are secured. The poppet P is slidably movable within the body G to open and close the valve respectively.

The cylindrical casing C preferably comprises a straight section of tubing 11 having walls of substantially uniform cross section throughout, internally threaded at each end, and having an outlet opening 12 through the midsection for discharging fluids from the valve. The opening 12 may comprise a simple aperture as shown in Fig. 2 for emptying gas or liquid from the valve directly to the atmosphere, or the opening 12 may comprise a nipple 13 as shown in Fig. 1, threaded to receive standard pipe connections for discharging the fluid at a remote point. Except for the difference in the outlet 12, the valves of Figs. 1 and 2 are identical. With enclosed systems, or those employing noxious or inflammable fluids, use preferably is made of the valve disclosed in Fig. 1 whereby the discharged fluids may be emptied out-of-doors or into a suitable receptacle.

As shown in Figs. 1 and 2, the inlet body I comprises a bushing, threaded within the lower end of the tubing 11. The body I is provided with an inlet 14 adapted to communicate with fluid under pressure, e. g., the gas chamber of an acetylene generator. A valve seat 15, comprising an upwardly projecting ring, adjoins the inner end of the inlet 14 for cooperation with the poppet P.

The valve-guiding body G, which is threaded or otherwise secured within the opposite or upper end of the tubing 11, extends downwardly within the casing C toward the inlet body I. The body G comprises a generally tubular plug 16 having a reduced diameter portion 17 spaced inwardly from the inner wall of the tube 11 to form an annular discharge chamber 18 communicating with the discharge opening 12. A skirt 19 depending from the lower end of the portion 17 extends closely adjacent to the inlet body I and overlaps and surrounds the upwardly projecting seat 15 to form a valve chamber 21 between the respective valve bodies.

The poppet P comprises a valve head 22 located within the valve chamber 21, slidably held by a cylindrical bore 23 of the plug 16 for movement toward and away from the seat 15. A compression spring 24 or similar resilient means urges the head into normal closed position against the seat, in opposition to the pressure exerted by the fluid within the inlet 14. Adjustable tensioning means comprising a barrel-shaped nut 25 is adjustably threaded within the guide G so as to control the tension of the spring 24 and thereby regulate the force exerted by the spring on the head 22. The nut 25 is provided with a socket 26 or similar means adapted to engage a spanner or other type of wrench, whereby the position of the nut may be adjusted with respect to the body G. The threaded barrel 25 extends upwardly from the body G for engagement with a lock nut 27, preferably comprising a threaded cap which completely encloses the exposed portion of the nut 25. The abutment of the end of the cap 27 with the body G locks the tensioning means 25 in a predetermined position.

Manually operable unseating means extends from the head to a point outside of the valve body B. Such means comprises a lift pin 28 extending from the head 22 through the tubular plug 16, and through the nuts 25 and 27 to a point externally of the body B. A washer 29 adjoins a guide aperture 30 in the lock nut 27 for resilient engagement with the pin 28 so as to exclude the admission of dirt particles, moisture, and other foreign material to within the valve through the aperture 30. The pin 28 is bifurcated at its upper end for cooperation with a manually operable lever 31. Lifting the lever 31 shifts the pin 28 axially upward so as to raise the poppet valve P from the seat 15.

A lost-motion connection 32 joins the pin 28 and the head 22 whereby the head may be lifted in response to a predetermined increase in the pressure within inlet 14, without imparting corresponding motion to the lift pin 28. The lost-motion connection preferably comprises a pin and socket construction between the respective parts, whereby any lifting motion of the pin 28 is imparted to the head 22, but whereby the head 22 may be moved to the open position independently of movement of the lifter whenever the pressure forces the head upwardly. The lost-motion connection 32 additionally provides substantially universal tilting motion between the head and the pin so as to permit the valve head to locate itself properly on the seat 15. As best seen in Fig. 2, the lost-motion connection 32 may comprise upwardly projecting portions 33 overlapping the bottom of the lift pin 28. An elongated slot or aperture or oversize bore 34 extends transversely through the bottom end of the pin 28 to receive a wrist pin 35 extending between the respective portions 33. Preferably the portions 33 comprise the walls of a socket, the outer periphery of which is adapted to slide loosely within the cylindrical bore 23 of the body G. Accordingly, the bore 23 guides the head 22 during the unseating operation and yet allows sufficient relative swiveling motion between the head 22 and pin 28 to provide accurate mating between the head 22 and the seat 15. Since the head 22 may move relatively to the length of the pin 28, the weight of the manual lifting mechanism and the friction between the pin 28 and washer 29 in no way impede the action of the pressure-operated valve.

The head 22 is provided with a valve disc 40 having a downwardly directed flat face 36, which disc extends in a radial direction to a point adjacent to the periphery of the inner wall of the skirt 19. A diaphragm or gasket 37 comprising a disc of rubber or other resilient material lies against the face 36 so as to be located between the head 22 and the seat 15 to provide sealing engagement between the parts. Fastening means 38, such as a nut and washer, secured on a central threaded stud 39, holds the diaphragm at its center to the head 22, and thereby provides convenient means for replacing the diaphragm 37 whenever necessary. The free outer edges of the diaphragm 37 project radially beyond the central or gasket portion engaging the seat 15 toward an annular converging wall portion 41 formed on the inner periphery of the skirt 19. Although the diaphragm is in no way secured to the skirt 19, and is free for limited relative movement with respect thereto, the diaphragm may engage the portion 41 about the entire periphery thereof to form a substantially fluid-tight seal therewith, e. g., when the head moves a predetermined distance from the seat. The diaphragm 37 accordingly seals and protects the cylindrical bore 23 and the parts in the upper portion of the valve from the action of fluids discharged through the valve chamber 21.

Sufficient back pressure develops within the valve chamber 21 to hasten the full opening of the valve and render the action more positive as soon as the outer periphery of the diaphragm 37 seals against the annular converging wall 41. For example, the pressure initially operative on the valve is limited to that developed on the area of the diaphragm enclosed within the valve seat, whereas when the valve has opened sufficiently to seal the diaphragm with the wall 41, the force acting on the valve represents the pressure acting on substantially the entire area of the diaphragm. The additional force assists in lifting the valve rapidly into completely open position and in sealing the diaphragm edges more tightly against the wall 41. The valve remains open until the downward force of the compressed spring exceeds the upward force exerted by the pressure of the escaping fluid on substantially the entire diaphragm. By having the disc 40 extend almost to the periphery of the skirt 19, the diaphragm is supported about substantially its entire area, and the narrow unsupported fringe about the free periphery of the diaphragm has sufficient resiliency to form a fluid-tight seal with the wall 41. By having the edges of the diaphragm free, the parts may be assembled and disassembled without twisting the diaphragm.

An appreciable back pressure develops within the valve chamber 21 to render the opening action more positive because of the restricted passage between the valve chamber 21 and the annular discharge chamber 18. As shown in Figs. 1 and 2 the depending skirt portion 19 extends to a point closely adjacent to the inlet body I, thereby forming a relatively small annular orifice 42 through which the discharged fluids must pass. Since the body G is threaded vertically within the casing C, the size of the orifice 42 may be adjusted, and the parts may be set in predetermined positions by regulating the thickness of a gasket 43 which seals the body G with the casing C.

The annular upwardly projecting seat 15 at the entrance to the valve chamber 21 cooperates with the inner wall of the casing C to form an annular trough 44 into which the skirt 19 projects. The outlet opening 12 is located below the base of the trough so as to provide a natural drain for any liquid, such as condensates, which may accumulate in the trough. By locating the annular orifice 42 adjacent to the base of the trough, the discharge of fluids from the valve chamber tends to empty the trough of any residual accumulations. Additionally, the natural draining action provided by the construction, eliminates sluggish action of the valve which might otherwise result from the accumulation of liquids within the trough and the possible freezing of these liquids. Furthermore, it will be noted that the raised valve seat 15 between the inlet 14 and the chamber 21 drains naturally into the trough 42 or back to the inlet 14 so that no appreciable quantities of condensate can accumulate to freeze the valve in closed position. Additionally, the lost-motion connection 32 allows the valve to open freely even though the lift pin 28 should be frozen in position. Actual tests indicate that when condensate purposely is allowed to accumulate about the movable parts of the valve and then allowed to freeze, that full discharge is obtained at not more than one pound per square inch above the normal pressure. Furthermore, by having the rubber diaphragm 37 secured to the head at only the center portion thereof, the valve-operating pressure causes a slight lift of the poppet, deforming the diaphragm and causing it to pull loose progressively from the seat even when in a frozen condition.

It will be observed that the pressure-adjustment mechanism is completely protected by the threaded cap 27, thereby providing tamper-proof construction. Also, the gasket 37 may be replaced without disturbing the pressure adjustment, simply by unthreading the body G as a unit from the casing C.

As a typical example of operation, a valve of the type shown on Fig. 1, and constructed substantially to scale, with a ¾" standard pipe thread at the inlet 14 discharges over 2200 cubic feet per hour with the valve set to open at twelve pounds per square inch, and with a back pressure of 1.25 pounds per square inch, such as is produced by 25 feet of one inch piping and one elbow. The valve opens slowly, until the pressure builds up to fourteen or fifteen pounds per square inch, at which time the poppet suddenly lifts wide open, causing a rapid fall in pressure until the valve pops shut at a pressure of one or two pounds per square inch below the opening pressure. The valve of Fig. 2, with a ¾" pipe thread at the inlet, weighs but one pound, and discharges almost 2400 cubic feet per hour. The spring adjustment provides operation over a range extending at least between twelve and twenty-three pounds per square inch.

The valves disclosed in Figs. 3, 4, and 5 in many respects resemble the type of construction disclosed in Figs. 1 and 2. The same reference characters will be used to denote similar parts throughout the respective views.

The valve disclosed in Fig. 3 is intended for permanent installations wherein it is desirable to conduct the discharged fluid through piping to a suitable disposal point, while the valves disclosed in Figs. 4 and 5 are provided with discharge openings that vent directly to the atmosphere and therefore are more desirable for portable installations, and the like. As shown in Fig. 3, the valve body B comprises two parts, namely, an upper body U and a lower body L, the latter combining the inlet body and the cylindrical casing into an integral housing. The upper body U comprises substantially the construction of the guide body G shown in Fig. 2 in that it comprises a tubular member adapted to enclose and guide a poppet valve P' for movement to and from a valve seat 15'. Additionally, the upper body U provides an annular discharge chamber 18' formed between its outer periphery and the inner periphery of the cylindrical casing forming the side walls of the lower body L. The construction differs, however, in that use is made of a somewhat resilient washer or gasket 45 which provides a seal about its outer periphery between the upper body U and the lower body L. This washer is provided with a cylindrical aperture 46 adjacent to and communicating with the inlet passage 14. The poppet P' is provided with a downwardly projecting ring adapted to seat against the gasket 45 about the aperture 46. The body U is provided with a cylindrical bore 23' within which the poppet P' smoothly slides. A plurality of spaced rings or flanges 47 engage the walls of the bore 23' to provide substantially fluid-tight connection between the parts. A plurality of lower vents 48 are formed between a valve chamber 21' and the annular discharge chamber 18' at a point below the lower ring 47. One or more vents 49 similarly may be provided between the two chambers at a point above the lower ring 47 as shown in Fig. 3. Valve-lifting mechanism, and tensioning means are provided as shown in Figs. 1 and 2. The operation of the valve shown in Fig. 3 is similar to that of the valves shown in Figs. 1 and 2 in that the poppet P' may be lifted from the seating position without moving lift pin 28. Also, when the pressure in the inlet 14 first raises the poppet P' the force is increased by the additional pressure exerted against the lower ring 47. The vent 49 allows accumulated fluids in the upper portion of the valve to escape.

The valves disclosed in Figs. 4 and 5 are substantially identical to the valve of Fig. 3, with the exception of the location and size of the discharge openings 12' and 12". In each case the valve comprises an inlet body I and a valve-guiding body G secured in opposite ends of a cylindrical casing C such as a generally cylindrical tube 11'. The gasket 45 is secured about its outer periphery between the cylindrical casing C and the inlet body I by means of an inwardly projecting flange 49. The poppet P' which is of the same general type shown in Fig. 3 reciprocates within the inner periphery of the casing C, the walls of which are engaged by the rings 47. As shown in Fig. 4, one or more discharge openings 12' extend through the wall of the casing C from the valve chamber 21' to the atmosphere at a point below the lower ring 47, though in Fig. 4, the discharge chamber has been eliminated. In Fig. 5 the corresponding discharge opening 12" is located partially above the lower ring 47 so that the valve chamber 21' initially is unvented, so that the head receives the full effect of the pressure when the valve opens. The pressure on the lower ring 47 forces the poppet P' upwardly until the lower ring 47 rises above the opening 12", thereby venting the valve chamber 21'. At the same time the upper ring 47 engages a bottom of the guide body G closing off the upper part of the valve from the action of fluids passing through the valve.

It will be understood that various other modifications of the present invention may be made without departing from the scope thereof or sacrificing its advantages.

I claim:

1. In a valve having a valve body provided with a cylindrical bore, a valve chamber, and a raised valve seat at the entrance to said chamber, the combination comprising a tiltable poppet valve head having a flat seat-engaging portion; spring means normally pressing said valve head into closed position against said seat; a manually operable lift pin extending from said valve head and adapted to unseat said valve head; said valve head having an integral upwardly extending cylindrical portion of diameter no greater than said seat engaging portion and extending thereabove in loosely slidable engagement with said cylindrical bore; said integral portion having an inner wall closely confining a portion of said spring means, a recess below said inner wall slideably receiving said lift pin, and a shoulder between said wall and recess forming a seat for said spring means; and lost-motion connecting means located below said shoulder and thereby clear of said spring means and extending between said valve head and said lift pin, said connecting means providing universal tilting motion between said valve head and said lift pin, whereby said valve head is free to locate itself on said seat.

2. In a valve having a valve body provided with a cylindrical bore, a valve chamber in said body, a valve seat opening into said chamber, and inlet and outlet connections communicating with said chamber, the combination comprising a poppet valve head; a spring for urging said head into normal closed position; a manually operable valve lifter extending from said head to a point externally of said body; said valve head having an integral upwardly extending portion of diameter no greater than said seat engaging portion and extending thereabove in loosely slideable engagement with said cylindrical bore; said integral portion having an inner wall closely confining a portion of said spring, a recess below said inner wall slidably receiving said lift pin, and a shoulder between said inner wall and recess forming a seat for said spring; and lost-motion connecting means located below said shoulder and thereby clear of said spring and being adapted to provide relative movement between said head and said lifter when said head moves from said seat to the open position independently of said lifter, said head overlapping one end of said lifter; said connecting means comprising an elongated slot extending through said lifter, and a wrist pin passing from the overlapping portions of said head through said slot for loose sliding movement therein relative to the length of said lifter.

3. In a device of the character described having a valve body provided with a cylindrical bore, inlet and outlet connections, a valve chamber in said body, a valve seat opening into said chamber, a poppet valve, and a valve lifting stem projecting outside of said body, the combination comprising a spring within said body and urging said poppet valve inwardly with respect to said body; said poppet valve having an integral portion slidably guided in said cylindrical bore, said integral portion having a wall closely confining a portion of said spring, a recess therebelow of smaller diameter slidably receiving said valve-lifting stem, and a shoulder therebetween forming a seat for said spring; a pin below said shoulder connecting said poppet valve and said stem; adjustable spring tensioning means extending through the wall of said body and being adapted to vary the force of said spring against said poppet valve; and a cap apertured to receive the projecting end of said stem, said cap completely enclosing the portion of said adjustable means extending through said wall, said cap locking said adjustable means in predetermined position.

4. In a valve having a valve body provided with a cylindrical bore, inlet and outlet connections, a valve chamber in said body, a valve seat in said chamber, and a poppet valve head, the combination comprising a lift pin connected to said head and projecting exteriorly of said body; a spring surrounding said lift pin and being adapted to press said valve head against said seat; said valve head having an integral portion slideably guided in said cylindrical bore; said integral portion having an inner wall closely confining a portion of said spring, a recess therebelow slideably receiving said lift pin, and a shoulder therebetween forming a seat for said spring; a pin below said shoulder connecting said valve head and said lift pin; adjustable spring-tensioning means projecting through said body and being adapted to vary the force of said spring on said head; a cap on the outside of said body apertured to receive the projecting end of said lift pin and being adapted to engage and enclose the projecting end of said adjustable means to lock said adjustable means in predetermined position; and a resilient sealing washer held by the inner walls of said cap and frictionally engaging the sides of said lift pin to exclude foreign material from said valve.

5. The combination as claimed in claim 4 including a lost-motion connection between said lift pin and said valve head, said connection allowing a limited degree of movement of said head away from said seat without imparting such movement to said lift pin.

6. A valve comprising a central casing formed of an open-ended section of tubing having a wall of uniform cross section throughout; a discharge aperture extending through said wall; an inlet body secured in one end of said tubing; a valve seat on said inlet body; a valve-guide body secured in the opposite end of said tubing; a movable poppet valve head supported therein for movement toward and from said valve seat, said valve body having a cylindrical bore, and said valve head having an integral portion in slideably guiding engagement with said cylindrical bore; said integral extension having an inner wall, a recess of reduced diameter, and an annular shoulder therebetween; a valve stem slidably received in said recess; a spring closely coiled about said stem within said wall and engaging said shoulder, a pin below said shoulder and connecting said stem and valve head; the space between said two bodies forming a valve chamber for receiving said head and communicating with said discharge aperture.

7. A valve comprising a central casing formed of an open-ended tube having a wall of uniform inside and outside diameter substantially throughout its length, but having a discharge opening through said walls; an inlet body secured in one end of said tube; a valve seat adjacent to the inner end of said inlet body; a valve-guide body secured in the opposite end of said tube; a poppet valve supported therein in position to cover and uncover said valve seat; said valve-guide body having an annular portion extending within said tube and overlapping said valve seat, said guide valve body having a cylindrical bore and said poppet valve having an integral extension in slideably guiding engagement with said cylindrical bore; said integral extension having an inner wall, a recess of reduced diameter and an annular shoulder therebetween; a valve stem slideably received in said recess; a spring closely coiled about said stem within said wall and engaging said shoulder, a pin below said shoulder connecting said stem and valve head; said portion being of smaller diameter than the inside of said tube to form with said tube an annular discharge chamber communicating with said discharge opening.

8. In a fluid pressure relief valve having a valve body, an inlet adapted to communicate with fluid under pressure, a valve chamber within said body, an annular discharge chamber surrounding said valve chamber, a valve seat between said inlet and said valve chamber, an outlet communicating with said discharge chamber, the combination comprising a poppet valve within said valve chamber and having a recess and an annular shoulder; a valve stem slidably received in said recess; a spring closely coiled about said stem and engaging said shoulder; a pin below said shoulder connecting said stem and poppet valve; a diaphragm of resilient material; means for securing said diaphragm in position with respect to said poppet valve for sealing engagement with said seat.

9. The combination as claimed in claim 8, wherein said valve head comprises a disc-like member having a flat face against which said diaphragm lies, said disc-like member extending outwardly from said seat, and having a periphery adjoining the peripheral wall of said valve chamber.

10. The combination as claimed in claim 8 wherein said diaphragm is secured to said head only at the central portion of said diaphragm, and wherein said diaphragm is sufficiently resilient to be distorted during the opening movement of said head whenever said diaphragm adheres to said seat.

11. A fluid pressure relief valve having a valve body, a valve body chamber having annular converging wall portions within said body, an inlet adapted to conduct fluid under pressure to said chamber, a restricted outlet communicating with said chamber, an annular valve seat at the juncture between said inlet and said chamber, a valve head comprising a disc-like member normally covering said seat but movable away from said seat and a spring urging said valve head toward said seat, a resilient diaphragm, means for securing said diaphragm to said head, said diaphragm comprising a gasket located between said disc-like portion and said seat, and extending outwardly toward the walls of said valve chamber, said diaphragm having a periphery free to engage and form a substantially fluid-tight seal with said annular converging wall portions when said head moves a predetermined distance from said seat, the pressure of fluid within said chamber thereby being operative against said diaphragm to assist in moving said valve head further from said seat against the action of said spring.

12. A fluid pressure relief valve comprising a valve body; said body including a central tubular casing, an outlet in said casing, an inlet body secured in one end of said casing, a valve seat at the inner end of said inlet body, and a poppet-valve guiding body removably mounted in the opposite end of said casing; said poppet-valve guiding body being provided with a guide passage in alignment with said seat, and having an annular portion within said casing spaced from the wall thereof to form an annular chamber communicating with said outlet, the inner end of said annular portion surrounding said seat when the parts are in assembled relation; a poppet valve head slidably mounted within said guide passage and adapted to engage and disengage said seat; and a spring within said guide passage urging said head against said seat, said valve body having a cylindrical bore; said valve head having an integral extension in slideably guiding engagement with said cylindrical bore; said integral extension having an inner wall, a recess of reduced diameter, and an annular shoulder therebetween; a valve stem slideably received in said recess; a spring closely coiled about said stem within said wall and engaging said shoulder, and a pin below said shoulder connecting said stem and valve guide head.

13. A fluid pressure relief valve comprising a valve body; said body including a central tubular casing, an outlet in said casing, an inlet body secured in one end of said casing, a valve seat at the inner end of said inlet body, and a poppet-valve guiding body removably mounted in the opposite end of said casing; said poppet-valve guiding body being provided with a guide passage in axial alignment with said seat, and having an annular portion spaced within said casing to form an annular chamber communicating with said outlet, the inner end of said annular portion surrounding said seat when the parts are in assembled relation; a poppet-valve head slidable within said guide passage and adapted to engage and disengage said seat; a spring within said guide passage urging said head against said seat; and a resilient diaphragm secured to said head and movable therewith, said diaphragm having a central gasket portion located between said head and said seat, and a free outer portion extending radially from said gasket portion, said outer portion being adapted to engage and form a substantially fluid-tight seal with a periphery of said annular portion to thereby protect said guide passage from the action of fluid passing through said valve.

14. A pressure relief valve comprising a hollow valve body; an annular trough in said body, the walls of said trough comprising an upwardly-projecting annular valve seat and the surrounding wall of tsaid body; an inlet adapted to communicate with fluid under pressure and comprising a passage extending upwardly through said seat; an outlet in the wall of said valve body adapted to drain liquid from the base of said trough; a valve head covering said seat when said valve is closed; spring means normally pressing said valve head against said valve seat; a lift pin extending from said valve head; said valve head having a shoulder forming a seat for said spring means; a pin below said shoulder connecting said lift pin and said valve head; and a depending skirt portion surrounding said seat to deflect fluid discharged from said seat, said skirt portion extending substantially to the base of said trough in an annular zone intermediate the walls of said trough, and forming with the base of said trough an annular orifice for the passage of said discharge fluid.

15. A pressure relief valve as claimed in claim 14 wherein said skirt portion is vertically adjustable to alter the effective size of said orifice.

16. A valve comprising an upper body, a lower body, and means for threadedly connecting said upper and lower bodies, said valve having a cylindrical bore therein; a valve head slidably guided in said bore; said lower body having an inlet; a resilient gasket interposed between said valve head and the portion of said lower body surrounding said inlet; said upper body having a threaded bore therethrough in communication with said cylindrical bore; a barrel-shaped nut threaded into said threaded bore; a valve lift pin passing through said barrel-shaped nut; a coil compression spring surrounding said pin and engaging said nut; the top of said valve head having a hollow integral upward extension guided in said cylindrical bore and with an inner wall closely confining a portion of said spring and an annular shoulder forming a seat for the lower end of said spring and a recess slidably receiving the lower end of said lift pin; said lower end of said lift pin within said recess having a longitudinal slot; and a wrist pin passing through said valve head below said shoulder and through said slot.

17. In a fluid pressure relief valve having a valve body, a valve chamber having an annular skirt, an annular valve seat, and a valve head comprising a member normally covering said seat but movable away from said seat, the combination comprising a resilient diaphragm; and means securing said diaphragm to said head, said diaphragm comprising an inner annular gasket portion located between said member and said seat, and a free outer portion extending radially from said gasket portion outwardly toward said skirt and terminating in an outer edge adapted to engage and form a substantial fluid-tight seal with said skirt when said head moves a predetermined distance from said seat.

RALPH C. PIERSON.